US012614289B2

(12) United States Patent
Gundappa

(10) Patent No.: US 12,614,289 B2
(45) Date of Patent: Apr. 28, 2026

(54) DETERMINING DISPENSER VEHICLE CONNECTION

(71) Applicant: Wayne Fueling Systems LLC, Austin, TX (US)

(72) Inventor: Sangamesh Gundappa, Bengaluru (IN)

(73) Assignee: Wayne Fueling Systems LLC, Austin, TX (US)

( * ) Notice: Subject to any disclaimer, the term of this patent is extended or adjusted under 35 U.S.C. 154(b) by 383 days.

(21) Appl. No.: 17/932,145

(22) Filed: Sep. 14, 2022

(65) Prior Publication Data

US 2023/0080450 A1 Mar. 16, 2023

Related U.S. Application Data

(60) Provisional application No. 63/245,168, filed on Sep. 16, 2021.

(51) Int. Cl.
*G06T 7/246* (2017.01)
*G06T 7/70* (2017.01)
(Continued)

(52) U.S. Cl.
CPC .............. *G06T 7/251* (2017.01); *G06T 7/70* (2017.01); *G06V 10/761* (2022.01);
(Continued)

(58) Field of Classification Search
CPC . G06T 2207/30252; G06T 7/251; G06T 7/70; G06T 2207/30232; G08B 31/00;
(Continued)

(56) References Cited

U.S. PATENT DOCUMENTS 5,605,182 A 2/1997 Oberrecht et al.
6,052,629 A 4/2000 Leatherman et al.
(Continued)

FOREIGN PATENT DOCUMENTS

CN 1369428 A 9/2002
CN 2730698 Y 10/2005
(Continued)

OTHER PUBLICATIONS

International Search Report and Written Opinion for International Application No. PCT/US2022/076399, mailed on Dec. 19, 2022, 15 pages.

(Continued)

*Primary Examiner* — Chan S Park
*Assistant Examiner* — Chandhana Pedapati
(74) *Attorney, Agent, or Firm* — Mintz, Levin, Cohn, Ferris, Glovsky and Popeo, P.C.

(57) ABSTRACT

In one aspect, image data characterizing a video feed acquired by a camera oriented toward and including a field of view, of a forecourt of a dispensing station, that includes a dispenser and a vehicle can be received. Movement data indicating that the vehicle is physically connected to the dispenser while the vehicle is in motion can be determined from the received image data. A command can be determined based on the determined movement data. The command can be provided. Related apparatus, systems, methods, techniques, and articles are also described.

16 Claims, 4 Drawing Sheets

100

110 — RECEIVE IMAGE DATA CHARACTERIZING A VIDEO FEED ACQUIRED BY A CAMERA ORIENTED TOWARD AND INCLUDING A FIELD OF VIEW OF A FORECOURT OF A DISPENSING STATION, THE FIELD OF VIEW INCLUDING A DISPENSER AND A VEHICLE

120 — DETERMINE, FROM THE RECEIVED IMAGE DATA, MOVEMENT DATA INDICATING THAT THE VEHICLE IS PHYSICALLY CONNECTED TO THE DISPENSER WHILE THE VEHICLE IS IN MOTION

130 — DETERMINE A COMMAND BASED ON THE DETERMINED MOVEMENT DATA

140 — PROVIDE THE COMMAND

(51) Int. Cl.
    *G06V 10/74*     (2022.01)
    *G06V 10/94*     (2022.01)

(52) U.S. Cl.
    CPC .. *G06V 10/945* (2022.01); *G06T 2207/30232* (2013.01); *G06T 2207/30252* (2013.01); *G06V 2201/07* (2022.01); *G06V 2201/08* (2022.01)

(58) Field of Classification Search
    CPC .... G08B 21/02; G06V 10/761; G06V 10/945; G06V 2201/07; G06V 2201/08; B67D 7/068
    See application file for complete search history.

(56)             References Cited

U.S. PATENT DOCUMENTS

| | | | |
|---|---|---|---|
| 6,070,156 A | 5/2000 | Hartsell, Jr. | |
| 6,098,879 A | 8/2000 | Terranova | |
| 6,152,591 A | 11/2000 | Mccall et al. | |
| 6,275,746 B1 | 8/2001 | Leatherman et al. | |
| 6,334,474 B1 * | 1/2002 | Rababy | B67D 7/3218 |
| | | | 141/94 |
| 6,380,853 B1 | 4/2002 | Long et al. | |
| 6,381,514 B1 | 4/2002 | Hartsell, Jr. | |
| 6,422,464 B1 | 7/2002 | Terranova | |
| 6,493,440 B2 | 12/2002 | Gromatzky et al. | |
| 6,571,151 B1 | 5/2003 | Leatherman | |
| 6,574,603 B1 | 6/2003 | Dickson et al. | |
| 6,690,275 B2 | 2/2004 | Long et al. | |
| 6,690,357 B1 | 2/2004 | Dunton et al. | |
| 6,734,798 B2 | 5/2004 | Smith | |
| 6,741,909 B2 | 5/2004 | Leatherman et al. | |
| 6,882,900 B1 | 4/2005 | Terranova | |
| 7,604,169 B2 | 10/2009 | Demere | |
| 7,624,042 B2 * | 11/2009 | Negley, III | G06Q 20/42 |
| | | | 705/16 |
| 7,810,722 B2 | 10/2010 | Dodson | |
| 7,948,376 B2 | 5/2011 | DeLine | |
| 8,284,053 B2 | 10/2012 | DeLine | |
| 8,429,095 B1 | 4/2013 | Ryan | |
| 8,554,688 B2 | 10/2013 | Harrell et al. | |
| 8,761,924 B2 | 6/2014 | Leatherman et al. | |
| 8,924,267 B1 | 12/2014 | Terranova | |
| 8,965,569 B2 | 2/2015 | Siler | |
| 9,120,664 B2 | 9/2015 | Birkler et al. | |
| 9,135,615 B1 | 9/2015 | Mutha | |
| 9,139,414 B2 | 9/2015 | Bergqvist | |
| 9,477,317 B1 | 10/2016 | Clements | |
| 10,131,531 B1 | 11/2018 | Prasad et al. | |
| 10,134,042 B1 | 11/2018 | Prasad et al. | |
| 10,181,154 B1 | 1/2019 | Budde et al. | |
| 10,269,082 B2 | 4/2019 | Morris et al. | |
| 10,726,508 B2 | 7/2020 | Morris et al. | |
| 10,778,937 B1 * | 9/2020 | Dingli | G10L 17/06 |
| 11,420,862 B2 * | 8/2022 | Walsh | B67D 7/04 |
| 11,494,855 B2 | 11/2022 | Morris et al. | |
| 2002/0104582 A1 | 8/2002 | Kanamori et al. | |
| 2002/0116261 A1 | 8/2002 | Moskowitz et al. | |
| 2003/0028285 A1 | 2/2003 | Zura et al. | |
| 2003/0041330 A1 | 2/2003 | Smith | |
| 2004/0095230 A1 | 5/2004 | Li et al. | |
| 2004/0154687 A1 | 8/2004 | Mann | |
| 2005/0000588 A1 | 1/2005 | Webb et al. | |
| 2007/0119859 A1 * | 5/2007 | Harrell | G07F 9/026 |
| | | | 222/23 |
| 2007/0265733 A1 * | 11/2007 | Harrell | G07F 13/025 |
| | | | 700/283 |
| 2008/0040287 A1 * | 2/2008 | Harrell | G07F 7/1075 |
| | | | 705/71 |
| 2008/0229409 A1 | 9/2008 | Miller et al. | |
| 2008/0235105 A1 | 9/2008 | Payne et al. | |
| 2008/0313078 A1 | 12/2008 | Payne et al. | |
| 2009/0048709 A1 | 2/2009 | DeLine | |
| 2009/0048711 A1 | 2/2009 | DeLine | |
| 2009/0048945 A1 | 2/2009 | DeLine | |

| | | | |
|---|---|---|---|
| 2009/0192938 A1 | 7/2009 | Amos | |
| 2009/0254439 A1 | 10/2009 | Dunn | |
| 2011/0137470 A1 | 6/2011 | Sumilla et al. | |
| 2011/0273371 A1 | 11/2011 | Payne et al. | |
| 2011/0288721 A1 | 11/2011 | Christensen et al. | |
| 2011/0295415 A1 | 12/2011 | Bartlett et al. | |
| 2012/0101882 A1 | 4/2012 | Todd | |
| 2013/0061258 A1 | 3/2013 | Takaya et al. | |
| 2013/0091464 A1 | 4/2013 | Chang et al. | |
| 2013/0103585 A1 | 4/2013 | Carapelli | |
| 2013/0216102 A1 | 8/2013 | Ryan et al. | |
| 2013/0246171 A1 | 9/2013 | Carapelli | |
| 2013/0271360 A1 | 10/2013 | Macdougall et al. | |
| 2013/0300985 A1 | 11/2013 | Bulda | |
| 2014/0063060 A1 | 3/2014 | Maciocci et al. | |
| 2014/0072171 A1 | 3/2014 | Tu et al. | |
| 2014/0093125 A1 | 4/2014 | Hradetzky | |
| 2014/0195046 A1 | 7/2014 | Fadler et al. | |
| 2014/0246453 A1 | 9/2014 | Lin | |
| 2014/0327778 A1 | 11/2014 | Mcquade et al. | |
| 2015/0106196 A1 | 4/2015 | Williams et al. | |
| 2015/0242855 A1 | 8/2015 | Vilnai | |
| 2015/0242969 A1 | 8/2015 | Pallas et al. | |
| 2015/0329349 A1 | 11/2015 | Larsson et al. | |
| 2015/0363070 A1 | 12/2015 | Katz | |
| 2016/0078289 A1 | 3/2016 | Michel et al. | |
| 2016/0171472 A1 | 6/2016 | Pugh et al. | |
| 2016/0247153 A1 | 8/2016 | Lesesky | |
| 2016/0357399 A1 | 12/2016 | Shin et al. | |
| 2016/0364718 A1 | 12/2016 | Betancourt et al. | |
| 2017/0081169 A1 | 3/2017 | Debeaux et al. | |
| 2017/0083988 A1 | 3/2017 | Butsch et al. | |
| 2017/0193716 A1 | 7/2017 | Wittliff, III | |
| 2017/0247241 A1 | 8/2017 | Blyth | |
| 2017/0308964 A1 | 10/2017 | Morris et al. | |
| 2017/0308965 A1 | 10/2017 | Morris et al. | |
| 2018/0080427 A1 | 3/2018 | Ghannam et al. | |
| 2018/0107891 A1 | 4/2018 | Schmidt et al. | |
| 2018/0222741 A1 | 8/2018 | Cox et al. | |
| 2018/0272886 A1 | 9/2018 | StÖcker et al. | |
| 2018/0276671 A1 | 9/2018 | Pastor | |
| 2018/0308347 A1 * | 10/2018 | Bruck | H05B 47/196 |
| 2018/0368207 A1 | 12/2018 | Carapelli | |
| 2019/0213692 A1 | 7/2019 | Morris et al. | |
| 2020/0202460 A1 | 6/2020 | Morris et al. | |

FOREIGN PATENT DOCUMENTS

| | | | | |
|---|---|---|---|---|
| CN | 101925916 A | 12/2010 | | |
| CN | 103236167 A | 8/2013 | | |
| CN | 103996295 A | 8/2014 | | |
| CN | 204138340 U | 2/2015 | | |
| DE | 102005002245 A1 * | 7/2006 | | B67D 7/3209 |
| EP | 3445706 A1 | 2/2019 | | |
| GB | 2417152 A * | 2/2006 | | G07F 13/025 |
| JP | H05338700 A | 12/1993 | | |
| JP | H11327753 A | 11/1999 | | |
| JP | 2002216219 A | 8/2002 | | |
| JP | 2005063090 A | 3/2005 | | |
| JP | 2010092505 A | 4/2010 | | |
| JP | 2012027104 A | 2/2012 | | |
| JP | 2020140236 A | 9/2020 | | |
| WO | 0021023 A1 | 4/2000 | | |
| WO | 2012088034 A2 | 6/2012 | | |
| WO | 2015002026 A1 | 1/2015 | | |
| WO | 2017184319 A1 | 10/2017 | | |

OTHER PUBLICATIONS

Extended European Search Report received for European Application No. 17786316.4, mailed on Nov. 7, 2019, pages.
International Preliminary Report on Patentability received for PCT Application No. PCT/US2017/025430, mailed on Nov. 1, 2018, 10 pages.
International Search Report and Written Opinion received for PCT Application No. PCT/US2017/025430, mailed on Aug. 16, 2017, 14 pages.

(56) References Cited

OTHER PUBLICATIONS (July 15, 2008) The Research on Factors Affecting the Evolution of Automobiles's Shape, Ma Chao Beijing Institute of Technology, 7 pages.

Fujitsu (Jun. 11, 2016) "PalmSecure", 3 pages.

MIMS (Dec. 2011) "The Wallet in Your Skin", Scientific American, 1 page.

Rautaray et al. (Jan. 1, 2012) "Vision Based Hand Gesture Recognition for Human Computer Interaction: A Survey", Artificial Intelligence Review, 43(1):54 pages.

Trader John (Jun. 10, 2011) "The Top 5 Reasons To Consider Fujitsu PalmSecure Biometric Technology Over Fingerprint", M2SYS Blog On Biometric Technology, 4 pages.

* cited by examiner

100

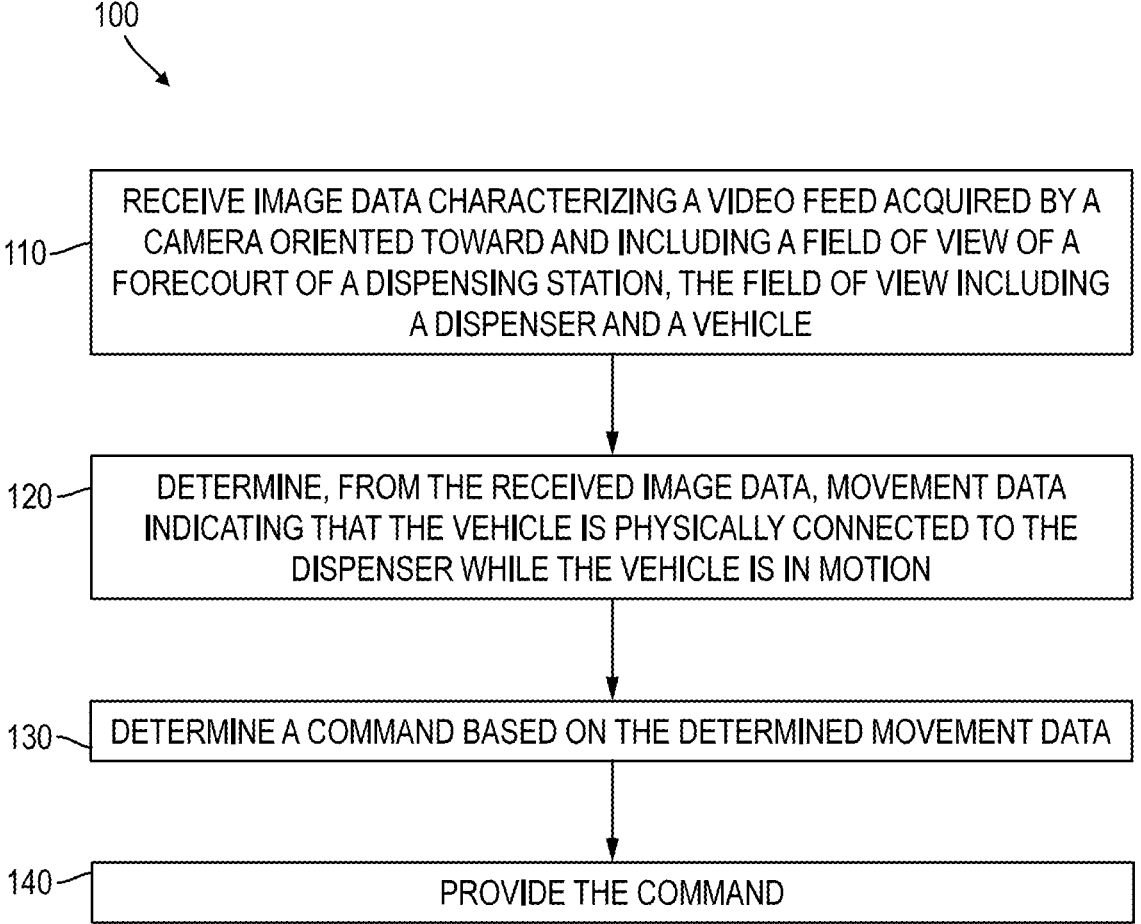

110 — RECEIVE IMAGE DATA CHARACTERIZING A VIDEO FEED ACQUIRED BY A CAMERA ORIENTED TOWARD AND INCLUDING A FIELD OF VIEW OF A FORECOURT OF A DISPENSING STATION, THE FIELD OF VIEW INCLUDING A DISPENSER AND A VEHICLE

120 — DETERMINE, FROM THE RECEIVED IMAGE DATA, MOVEMENT DATA INDICATING THAT THE VEHICLE IS PHYSICALLY CONNECTED TO THE DISPENSER WHILE THE VEHICLE IS IN MOTION

130 — DETERMINE A COMMAND BASED ON THE DETERMINED MOVEMENT DATA

140 — PROVIDE THE COMMAND

*FIG. 1*

DETERMINING DISPENSER VEHICLE CONNECTION

CROSS-REFERENCED APPLICATIONS

This application claims the benefit of and priority under 35 U.S.C. § 119 to U.S. Provisional Patent Application No. 63/245,168 filed Sep. 16, 2021, the entire contents of which are hereby expressly incorporated by reference herein.

FIELD

The current subject matter relates to methods, systems, and articles of manufacture for determining whether a dispenser is physically connected to a vehicle while the vehicle is in motion.

BACKGROUND

On some occasions, after completing a fuel and/or electricity dispensing transaction in which fuel or electricity is supplied to a dispenser user's vehicle, the dispenser user may re-enter their vehicle and begin to drive away with the dispenser nozzle (or dispenser charger cable, if the vehicle is electric) still inserted into the vehicle's fuel filler/charging port, which results in possible damage to the dispenser and/or the vehicle as well as an increased risk of safety and/or environmental issues in the forecourt of the dispensing station at which the fuel and/or electricity dispenser is located.

SUMMARY

In one aspect, image data characterizing a video feed acquired by a camera oriented toward and including a field of view, of a forecourt of a dispensing station, that includes a dispenser and a vehicle can be received. Movement data indicating that the vehicle is physically connected to the dispenser while the vehicle is in motion can be determined from the received image data. A command can be determined based on the determined movement data. The command can be provided.

One or more of the following features can be included in any feasible combination. For example, the determining of the movement data can include performing automatic monitoring on the video feed; identifying a feature in the video feed based on the automatic monitoring, the feature including at least one of a position and a motion of the dispenser; comparing the feature present in the video feed to at least one model feature, the model feature associated with the vehicle being physically connected to the dispenser while the vehicle is in motion; and determining a similarity measure for the feature, the similarity measure indicative of a degree to which the feature matches the at least one model feature, and the movement data can be determined when the determined similarity measure exceeds a predetermined threshold. For example, the feature can include at least one of a position and a motion of the vehicle. For example, the field of view can include a user of the dispenser, and the feature can include at least one of a position and a motion of the user. For example, a notification indicative of movement of the vehicle while the vehicle is physically connected to the dispenser can be generated, the generation of the notification can be based on the provided command, and the notification can be provided to an end user device. For example, the end user device can include an interactive display of a forecourt controller configured to manage operation of the dispensing station, the notification can include data characterizing a visual prompt configured to be presented on the interactive display that visually indicates the movement of the vehicle while the vehicle is physically connected to the dispenser, and the end user device can be configured to, in response to receiving the notification, provide the visual prompt on the interactive display. For example, the end user device can include a mobile device in operable communication with a forecourt controller configured to manage the operation of the dispensing station, the mobile device can include an interactive display, the notification can include data characterizing a visual prompt configured to be presented on the interactive display that visually indicates the movement of the vehicle while the vehicle is physically connected to the dispenser, and the end user device can be configured to, in response to receiving the notification, provide the visual prompt on the interactive display. For example, the command can be provided to an alarm system having at least one speaker oriented toward the forecourt, the command can cause an audio message to be provided via the at least one speaker, and the audio message can be indicative of movement of the vehicle while physically connected to the dispenser. For example, the alarm system can include at least one strobe lamp oriented toward the forecourt, and the command can cause the strobe lamp to illuminate to thereby indicate movement of the vehicle while physically connected to the dispenser. For example, the command can be transmitted to the vehicle, the vehicle can have a graphical display, the command can include data characterizing the determination that the vehicle is physically connected to the dispenser while the vehicle is in motion, and the vehicle can be configured to generate a visual notification that is indicative of movement of the vehicle while physically connected to the dispenser and to provide the visual notification to the graphical display for depiction thereon. For example, at least a portion of the fueling station can be deactivated in response to receiving the command. For example, the receiving, the determining, and the generating can be performed by at least one data processor forming part of at least one computing system.

In another aspect, a system is provided and can include at least one data processor and memory storing instructions configured to cause the at least one data processor to perform operations described herein. The operations can include receiving image data characterizing a video feed acquired by a camera oriented toward and including a field of view of a forecourt of a dispensing station, the field of view including a dispenser and a vehicle; determining, from the received image data, movement data indicating that the vehicle is physically connected to the dispenser while the vehicle is in motion; determining a command based on the determined movement data; and providing the command.

One or more of the following features can be included in any feasible combination. For example, the determining of the movement data can include performing automatic monitoring on the video feed; identifying a feature in the video feed based on the automatic monitoring, the feature including at least one of a position and a motion of the dispenser; comparing the feature present in the video feed to at least one model feature, the model feature associated with the vehicle being physically connected to the dispenser while the vehicle is in motion; and determining a similarity measure for the feature, the similarity measure indicative of a degree to which the feature matches the at least one model feature, and the movement data can be determined when the determined similarity measure exceeds a predetermined threshold. For example, the feature can include at least one of a position and a motion of the vehicle. For example, the field of view can include a user of the dispenser, and the feature can include at least one of a position and a motion of the user. For example, the operations can further comprise generating a notification indicative of movement of the vehicle while the vehicle is physically connected to the dispenser, the generating of the notification based on the provided command; and providing the notification to an end user device. For example, the end user device can include an interactive display of a forecourt controller configured to manage operation of the dispensing station, the notification can include data characterizing a visual prompt configured to be presented on the interactive display that visually indicates the movement of the vehicle while the vehicle is physically connected to the dispenser, and the end user device can be configured to, in response to receiving the notification, provide the visual prompt on the interactive display. For example, the end user device can include a mobile device in operable communication with a forecourt controller configured to manage the operation of the dispensing station, the mobile device can include an interactive display, the notification can include data characterizing a visual prompt configured to be presented on the interactive display that visually indicates the movement of the vehicle while the vehicle is physically connected to the dispenser, and the end user device can be configured to, in response to receiving the notification, provide the visual prompt on the interactive display. For example, the command can be provided to an alarm system having at least one speaker oriented toward the forecourt, the command can cause an audio message to be provided via the at least one speaker, and the audio message can be indicative of movement of the vehicle while physically connected to the dispenser. For example, the command can be transmitted to the vehicle, the vehicle can have a graphical display, the command can include data characterizing the determination that the vehicle is physically connected to the dispenser while the vehicle is in motion, and the vehicle can be configured to generate a visual notification that is indicative of movement of the vehicle while physically connected to the dispenser and to provide the visual notification to the graphical display for depiction thereon.

Non-transitory computer program products (i.e., physically embodied computer program products) are also described that store instructions, which when executed by one or more data processors of one or more computing systems, causes at least one data processor to perform the operations described herein. Similarly, computer systems are also described that may include one or more data processors and memory coupled to the one or more data processors. The memory may temporarily or permanently store instructions that cause at least one processor to perform one or more of the operations described herein. In addition, methods described herein can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 1 is a process flow diagram illustrating an example process of some implementations of the current subject matter that can provide for the determination of whether a dispenser is physically connected to a vehicle while the vehicle is in motion;

DETAILED DESCRIPTION

Figure 2:
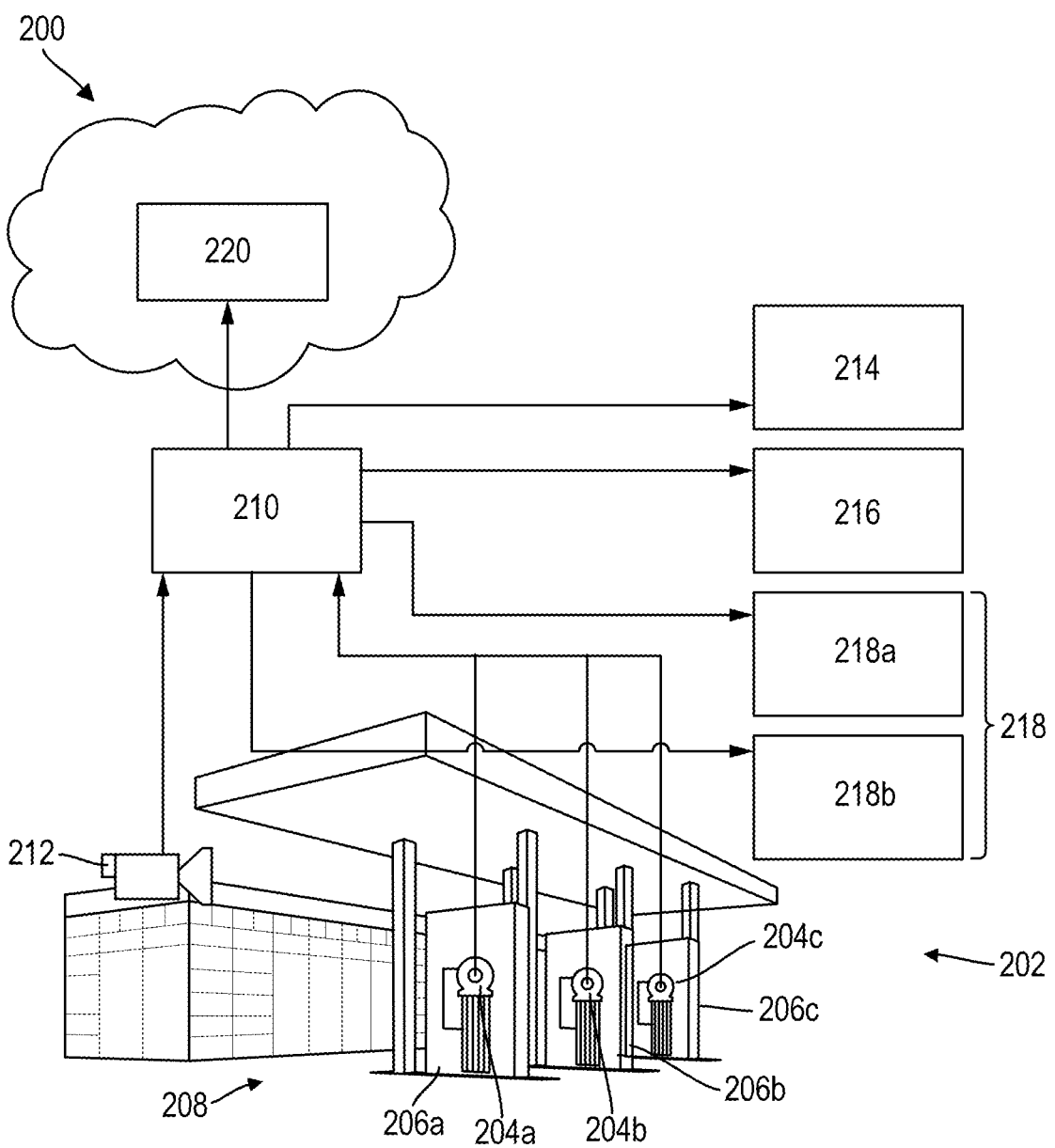
FIG. 2 is a schematic view illustrating components of an example system that can provide for the determination of whether a dispenser is physically connected to a vehicle while the vehicle is in motion.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Some implementations of the current subject matter relate to detecting whether a dispenser is physically connected to a vehicle while the vehicle is in motion. A system incorporating some implementations of the current subject matter can include at least one camera located at a fueling/electricity dispensing station and a processor configured to receive image and/or video data acquired by the camera. The processor can be further configured to continuously monitor the image and/or video data and determine whether the dispenser nozzle and/or charging cable is physically connected to the vehicle while the vehicle is in motion, and to take at least one action to mitigate the risk of harm to people or property at the fueling station based on the determination. Such an approach can provide for automated hazard detection and mitigation of hazardous situations at fueling stations with little to no human intervention required.

FIG. 1 is a process flow diagram illustrating an example process 100 of some implementations of the current subject matter that can provide for detection whether a dispenser is physically connected to a vehicle while the vehicle is in motion.

At 110, image data characterizing a video feed acquired by a camera oriented toward and including a field of view of a forecourt of a dispensing station can be received. The video feed can include a continuous stream of image frames recorded by at least one camera that can depict a variety of events that can occur at dispensing stations, and the field of view of the camera can include a dispenser, such as a fuel or electricity dispenser, that is located in the forecourt and a vehicle located in proximity to the dispenser. Example events include the entry and exit of customers wishing to purchase fuel at dispensers located within the forecourt from their vehicle or items at a convenience store located proximate the forecourt, the use of a fuel dispenser in a fueling transaction, the use of an electricity dispenser to charge an electric vehicle, and the like. In some implementations, the camera can be disposed on the dispenser, located in the forecourt, and oriented such that the drive aisle proximate the dispenser is within the field of view of the camera. In some implementations, the camera can be disposed on a building located proximate the forecourt, such as a car wash building or a convenience store building and oriented such that one or more dispensers within the forecourt are in the field of view of the camera. In some implementations, there may be multiple cameras, each with different fields of view that may or may not overlap depending on the implementation.

At 120, movement data indicating that the vehicle is physically connected to the dispenser while the vehicle is in motion can be determined from the received image data. The movement data can be determined by the performing of automatic monitoring on the video feed during a transaction at the dispenser. In some implementations, the automatic monitoring of the video feed can detect whether a dispensing transaction has begun by analyzing the video feed to determine whether a dispensing start event has occurred. Examples of a dispensing start event include the user picking up a fuel dispenser nozzle from a nozzle receptacle on a dispenser body and/or the user picking up a charger connector from a charger receptacle on the dispenser body. In some implementations, the automatic monitoring of the video feed can identify the location and/or motion of the hose that connects the fuel dispenser nozzle to the dispenser body and/or the location and/or motion of the charging cable connecting the charger connector and the dispenser body to determine whether the fuel dispenser nozzle and/or charger connector is coupled to the vehicle. In some implementations, the automatic monitoring of the video feed can identify the location and/or motion of the fuel dispenser nozzle and/or the charger connector to determine whether the fuel dispenser nozzle and/or charger connector is coupled to the vehicle. In some implementations, the automatic monitoring of the video feed can determine whether the vehicle is stationary or moving.

If, in the automatic monitoring of the video feed, the hose and/or charging cable is determined to be coupled to the vehicle by analyzing the position and/or motion of the hose and/or charging cable (or, alternatively, the nozzle and/or charging connector), and the vehicle is determined to be moving, a determination that the vehicle is physically connected to the dispenser while the vehicle is in motion is made, and movement data characterizing that determination is determined. In some implementations, if, in the automatic monitoring of the video feed, the hose and/or charging cable is determined to be moving and the vehicle is determined to be moving in coordination with the movement of the hose and/or charging cable, a determination that the vehicle is physically connected to the dispenser while the vehicle is in motion is made, and movement data characterizing that determination is determined. In some implementations, the automatic monitoring of the video feed can 1) determine that the driver of the vehicle has re-entered their vehicle after completing a fueling or charging transaction by analyzing the position and or patterns of movement of the user and/or the position of the nozzle and/or charging connector, and 2) determine that the hose and/or charging cable is still connected to the vehicle despite the fueling/charging transaction being completed. If, in the automatic monitoring of the video feed, this event occurs, a determination that the vehicle is physically connected to the dispenser while the vehicle is about to be put in motion is made, and movement data characterizing that determination is determined. For example, the automatic monitoring of the video feed, can determine that the fuel dispenser nozzle has not been returned to the nozzle receptacle on the dispenser body, and/or that or charging connector has not been returned to the charger receptacle on the dispenser body, and a determination that the vehicle may be physically connected to the dispenser while the vehicle is about to be put into motion is made, and movement data characterizing that determination is determined.

In some implementations, the automatic monitoring of the video feed can detect that the fueling and/or charging transaction has ended by analyzing the video feed to determine whether a dispenser end event has occurred. Examples of a dispensing end event include the user returning the fuel dispenser nozzle to the nozzle receptacle on the dispenser body and/or the user returning the charger connector to the charger receptacle on the dispenser body.

In some implementations, the automatic monitoring of the video feed and one or more of the determinations described above can be performed by using at least one predictive model, which can predict whether the vehicle is in motion, or about to be put into motion, while the hose/charging cable is connected to the vehicle, and the at least one predictive model can determine the movement data based on the prediction. For example, to make the prediction, the predictive model, which can include one or more machine learning algorithms, can recognize a feature present in the video feed during the automatic monitoring and determine whether the feature is substantially correlated with a model feature present in the predictive model that is indicative of actual/possible movement of the vehicle while the hose/charging cable is connected to the vehicle. Thereby, the predictive model can predict that there is a high likelihood that the feature present in the video feed indicates actual or possible movement of the vehicle while the hose/charging cable is connected to the vehicle.

Exemplary features include a vehicle, a user, a dispenser, a fuel dispenser hose, a fuel dispenser nozzle, a charging cable, a charging connector, and locations and/or movement patterns thereof. Exemplary model features include a location and/or a movement pattern of the dispenser user about the dispenser and/or the vehicle that is indicative of the dispenser user possibly preparing to drive away from the fuel dispenser while the hose/charging cable is connected to the vehicle, a location and/or movement pattern of the hose/charging cable relative to the dispenser and to the vehicle that is indicative of the dispenser user driving away from the fuel dispenser while the hose/charging cable is connected to the vehicle, a location and/or movement pattern of the fuel dispenser nozzle/charger connector relative to the dispenser and to the vehicle that is indicative of the dispenser user driving away from the fuel dispenser while the hose/charging cable is connected to the vehicle, and a movement pattern of the vehicle that is indicative of the dispenser user driving away from the fuel dispenser while the hose/charging cable is connected to the vehicle. In some implementations, the predictive model can compare the feature observed in the video feed to at least one image containing the model feature and determine a similarity measure between the feature and the model feature. The predictive model can transmit an indication that there is a high likelihood that the feature present in the video feed indicates that the vehicle is in motion, or about to be put into motion, while the hose/charging cable is connected to the vehicle when the similarity measure exceeds a predetermined threshold.

In some implementations, in analyzing the images present in the video feed, the predictive model can deconstruct each image by using edge and entity detection algorithms to dissect the image into constituent parts. The predictive model can analyze the constituent parts of each image and determine whether the feature is located in a constituent part that is positionally associated with one or more of the aforementioned model features. In an exemplary implementation, the predictive model, when monitoring the video feed, can detect and isolate, in each image of the video feed, such features as the dispenser user, the fuel dispenser hose/charging cable, and the vehicle. The predictive model can analyze each of these features in each image to determine a position of each of the dispenser user, the fuel dispenser hose/charging cable, and the vehicle, and the predictive model can collectively analyze the positions of each of the isolated features, which are determined for each image of the video feed, to determine movement patterns of each feature. The predictive model can compare the determined positions and/or movement patterns of the features to the positions and/or movement patterns embodied by the model features and determine a measure of similarity between the feature and the model features. If the measure of similarity exceeds a predetermined threshold, the predictive model has determined that there is a high likelihood that the vehicle is in motion while physically connected to the dispenser, and the movement data characterizing this occurrence can be determined.

At 130, a command can be determined based on the determined movement data. In some implementations, the command can include data characterizing an instruction to generate a notification indicative of movement of the vehicle while the vehicle is physically connected to the dispenser. In some implementations, the command can include data characterizing an instruction to activate an alarm system that indicates the movement of the vehicle while physically connected to the dispenser.

At 140, the command can be provided. In some implementations, the command can be provided to an end user device. The end user device can be a mobile device of a fueling station attendant, a fueling station owner, and/or other managers/administrators of the fueling station. In some implementations, the generated notification can include data characterizing a visual prompt configured to be presented on an interactive display of the mobile device that visually indicates the movement of the vehicle while the vehicle is physically connected to the dispenser. The end user device can, in response to receiving the notification, provide the visual prompt on the interactive display.

In some implementations, the end user device can be a fueling station terminal in operable communication with a forecourt controller configured to manage fueling transactions occurring within the forecourt and that can be operated by the fueling station attendant. In some implementations, the generated notification can include data characterizing a visual prompt configured to be presented on an interactive display of the mobile device that visually indicates the movement of the vehicle while the vehicle is physically connected to the dispenser. The end user device can, in response to receiving the notification, provide the visual prompt on the interactive display.

In some implementations, the command can be transmitted to a data processor of the vehicle. In response to receiving the command, the data processor of the vehicle can generate a visual notification that is indicative of the movement of the vehicle while physically connected to the dispenser, and the data processor can provide the visual notification to a graphical display, located on a dashboard of the vehicle, for depiction thereon and observance by a driver of the vehicle.

In some implementations, the command can be provided to an alarm system having at least one speaker oriented toward the forecourt and in audible range of any customers or station attendants in the forecourt or surrounding areas (e.g., convenience store, car wash). The command can cause an audio message to be provided via the at least one speaker that indicates the movement of the vehicle while it is physically connected to the dispenser. In some implementations, the alarm system can include a strobe lamp that is visible from within the forecourt, and the command can cause the strobe lamp to illuminate to thereby indicate the movement of the vehicle while it is physically connected to the dispenser. In some implementations, the alarm system can have an audio speaker and/or a strobe lamp positioned in a convenience store proximate the forecourt that is configured to warn patrons inside the convenience store of the presence of the hazard in the forecourt.

In some implementations, the command can be received by the forecourt controller, which can cause some or all of the fueling station to be deactivated in response to the command. The command can indicate which portions (e.g., one or more fuel dispensers, the car wash, etc.) of the fueling station are to be deactivated by the forecourt controller, the determination of which is made based on a determination of which portions of the fueling station are impacted, or could be impacted, by a fuel spill resulting from possible damage to the fuel dispenser caused by the movement of the vehicle while connected to the fuel dispenser. For example, the command can include an instruction to disable the flow of fuel to that dispenser to thereby stop any possible leakage of fuel from the dispenser that might occur if the movement of the vehicle while physically connected to the dispenser causes damage to the dispenser.

FIG. 2 is a schematic view illustrating components of an example system 200 for automated threat detection and mitigation at a fueling and/or charging station. As shown, the system 200 can be located at a dispensing station 202 and can include cameras 204a, 204b, 204c, each disposed on dispensers 206a, 206b, 206c, respectively, and oriented such that at least a portion of a forecourt 208 of the dispensing station 202, and/or at least a portion of one or more of the dispensers 206a, 206b, 206c is in the field of view of the cameras 204a, 204b, 204c. Although system 200, as shown in FIG. 2, features three cameras 204a, 204b, 204c, any number of cameras can be used. The cameras 204a, 204b, 204c can be configured to acquire one or more images and/or a video feed of a forecourt 208 of the dispensing station 202, of one or more users or vehicles (not shown) located in the forecourt 208, and/or of at least a portion of one or more of the dispensers 206a, 206b, 206c. The cameras 204a, 204b, 204c and the dispensers 206a, 206b, 206c can be located in the forecourt 208 and can be in operable communication with a server 210 having at least one data processor and memory which can form a part of at least one computing system. The cameras 204a, 204b, 204c can each provide their respective acquired video feeds to the server 210. The server 210 may be located at the dispensing station 202 or, in some implementations, the server 210 may be located offsite. In some implementations, the server 210 may be an Edge Hardware/video processing unit having at least one processor configured to execute one or more of the operations described herein. The server 210 can also be in operable communication with a forecourt camera 212 that is oriented such that the forecourt 208 is within a field of view of the forecourt camera 212 and is configured to acquire one or more images and/or a video feed of the forecourt 208, of one or more users or vehicles (not shown) located in the forecourt 208, and/or of at least a portion of one or more of the dispensers 206a, 206b, 206c, and provide them to the server 210. The processor of the server 210 is configured to monitor the video feeds received from the cameras 204a, 204b, 204c and/or the forecourt camera 212 and use a predictive model to detect a presence of a hazard within the forecourt 208 of the dispensing station 202.

The server 210 can also be operable communication with a fire suppression system 214 configured to dispense a fire extinguishing agent, a forecourt controller 216 that is configured to manage the dispensers 206a, 206b, 206c, and an alarm system 218 that includes at least one speaker 218a and at least one strobe lamp 218b. Each of the fire suppression system 214, the forecourt controller 216, and the alarm system 218 can receive a command issued by the server 210 to take one or more of the actions described herein to mitigate any harm to life or property that could result if the movement of the vehicle while physically connected to the impacted dispenser.

Figures 3A, 3B:
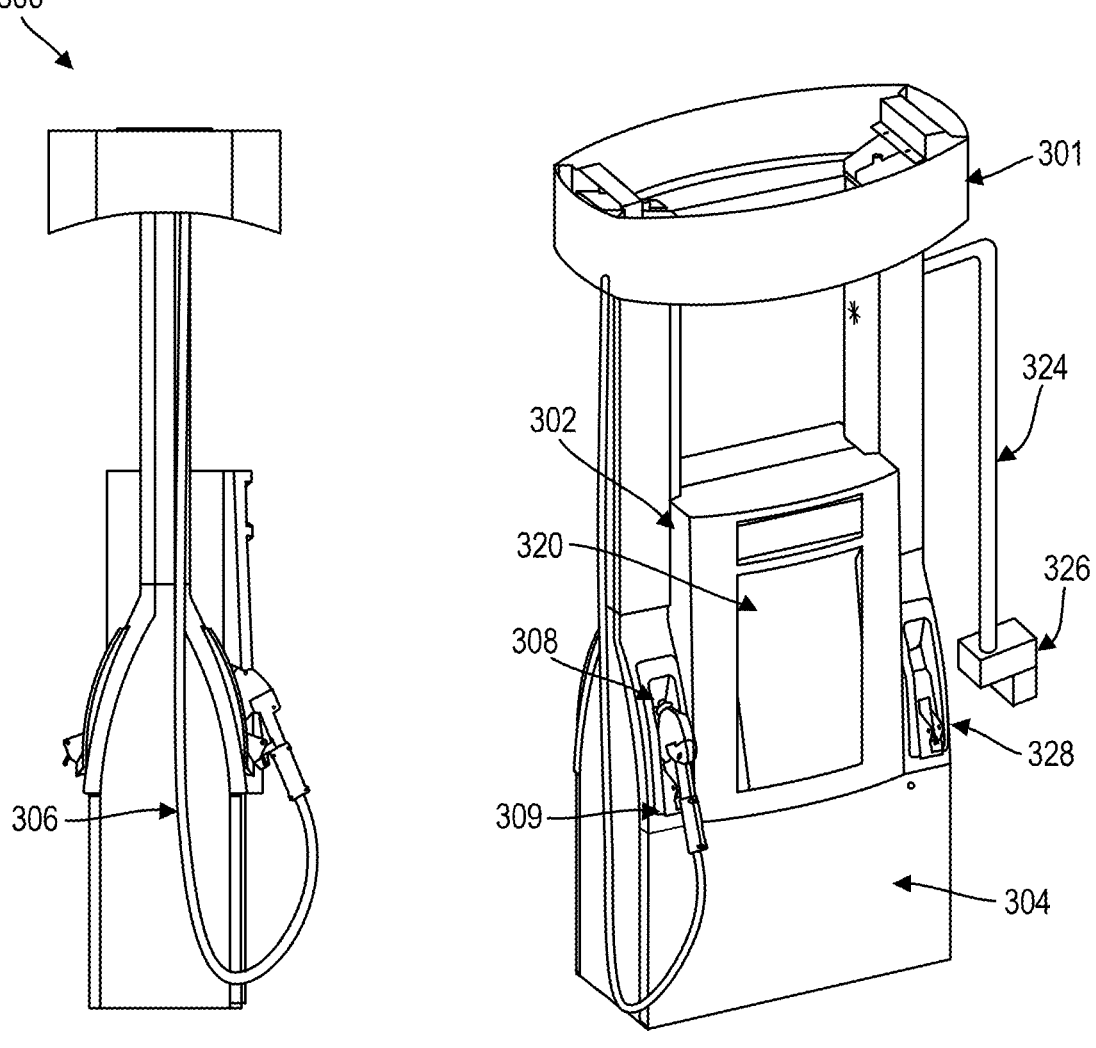
FIG. 3A is a side perspective view of one embodiment of a fuel dispenser.
FIG. 3B is a front perspective view of the fuel dispenser shown in FIG. 3A.
Figure 4:
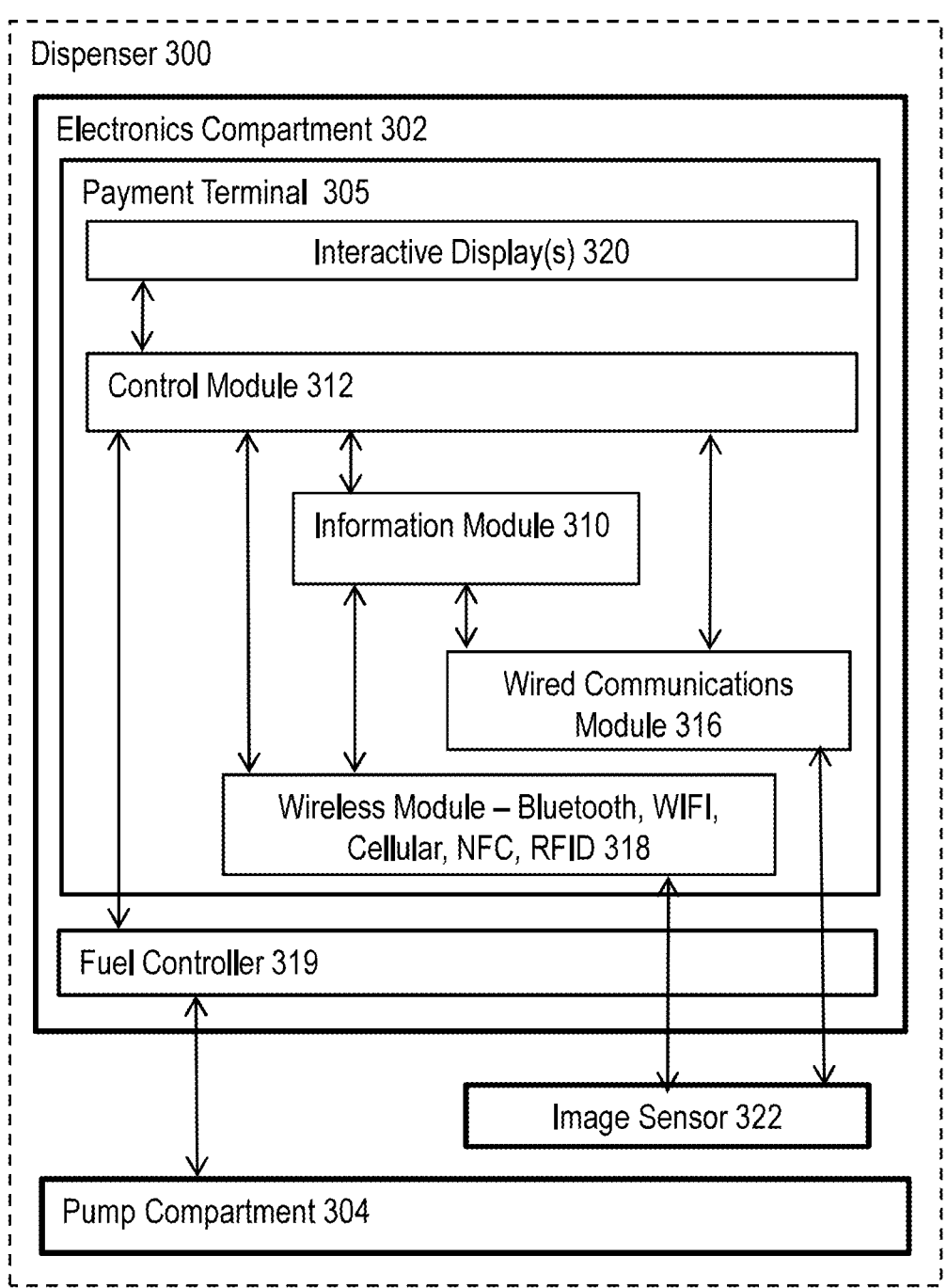
FIG. 4 is a diagram showing internal components of the fuel dispenser of FIGS. 3A and 3B.

FIGS. 3A and 3B illustrate one embodiment of a dispenser 300 that is configured to dispense fuel and that that can be used in some implementations of the current subject matter, and FIG. 4 illustrates components of the dispenser. In general, the dispenser 300 includes a dispenser body 301 having an electronics compartment 302, a pump compartment 304, and an image sensor 322. The pump compartment 304 houses a pump configured to pump fuel from a fuel tank or other reservoir, as well as one or more meters that can be configured to monitor fuel flow, flow of fuel additives, and/or flow of other components of the fuel. The pump compartment 304 can also include other components to facilitate fuel dispensing and mixing, such as motors and valves, a strainer/filtering system, a vapor recovery system, and the like. The pump compartment 304 is isolated from the electronics compartment 302 within the dispenser 300 to facilitate safety, security, and/or maintenance, as will be appreciated by a person skilled in the art. Fuel is thus not allowed to flow from the pump compartment 304 to the electronics compartment 302 and instead flows from the pump compartment 304 through hose 306 to a nozzle 308 for dispensing. As will be appreciated by a person skilled in the art, the nozzles 308 are each configured to dispense fuel from the dispenser 300 as pumped therefrom by the pump. The dispenser 300 also includes a nozzle receptacle 309 configured to store the nozzle 308 when not in use.

In some implementations, the dispenser 300 can be configured to dispense electricity and can include several components for dispensing the electricity. For example, dispenser 300 can include a charging cable 324 coupled to the dispenser body 301 at one end and configured to deliver electricity to a charging connector 326 coupled to an opposite end. The charging connector 326 can be configured to couple to a charging port of a vehicle (not shown) and to deliver the electricity provided by the dispenser 300, via the charging cable 324, to the vehicle when coupled to the charging port. When not in use, the charging connector 326 can be stored in a charger receptacle 328 formed on the dispenser body 301.

The electronics compartment 302 houses electronics for facilitating payment for fuel and for facilitating the dispensing of the fuel. For example, the electronics compartment 302 can include a fuel controller 319 that, at least in some implementations, includes a data processor, memory, and storage forming part of at least one computing system. The fuel controller 319 is configured to control dispensing of the fuel from the pump compartment 304. The electronics compartment 302 also includes a payment terminal 305 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller (not shown), and deliver fueling instructions to the fuel controller 319 to dispense fuel. The payment terminal 305 can also be configured to provide a user with information related to a status of fueling. For example, the payment terminal can display an amount of fuel that has been dispensed, and a corresponding fuel cost as the fuel mixture is dispensed.

The payment terminal 305 can be configured to facilitate communication between a user and the fuel controller 319, and can include an interactive display 320 and an information module 310. The information module 310 can, at least in some implementations include a data processor, memory, and storage, forming part of at least one computing system. The payment terminal 305 can also include one or more wired communication modules 316 and/or wireless communication modules 318 and a control module 312 that, at least in some implementations includes a data processor, memory, and storage, forming part of at least one computing system. The communication modules 316, 318 can function to allow data to be transmitted to and from various components within the payment terminal 305 via wired and/or wireless communication, respectively. For example, the communication modules 316, 318 can be configured to transmit and receive signals that can characterize, e.g., payment information, user identification information, and/or information regarding a desired fuel selection, via wired and/or wireless communications, respectively. The wireless communication module 318 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 316, 318 can be according to any of a variety of communication protocols, e.g., TCP/IP, etc., as will be appreciated by a person skilled in the art. The communication modules 316, 318 are also in operable communication with the image sensor 322 and are configured to receive image data acquired by the image sensor 322. The communication modules 316, 318 can additionally transmit the received image data for further external processing as described elsewhere herein.

The interactive display 320, which can be, or can include, a touchscreen. The interactive display 320 can be operably coupled to the control module 312 which can be used to control, dynamically rearrange, and/or update a graphical user interface (GUI) rendered on the display 320. The display 320 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 312 to be processed. Some examples of information that the display 320 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

The subject matter described herein can provide several advantages. For example, the continuous monitoring provided by the methods and systems described herein can allow for more immediate threat mitigation efforts to be taken, as the system can take a variety of actions to protect life and property once a vehicle driving away with a dispenser nozzle and/or charger cable attached is detected.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:

receiving image data characterizing a video feed acquired by a camera oriented toward and including a field of view of a forecourt of a dispensing station including at least one dispenser operably coupled to a forecourt controller configured to manage operation of the dispensing station, the field of view including the at least one dispenser and a vehicle;

determining, from the received image data, movement data indicating that the vehicle is physically connected to the at least one dispenser while the vehicle is in motion;

determining one or more commands based on the determined movement data;

providing a first command to an alarm system having at least one speaker oriented toward the forecourt, the first command causing the at least one speaker to emit an audio message indicative of movement of the vehicle while physically connected to the at least one dispenser;

providing a second command to the forecourt controller, the second command identifying the at least one dispenser to be deactivated;

disabling, by the forecourt controller and responsive to receiving the second command, a flow of fuel to the at least one dispenser identified in the second command;

generating a notification indicative of movement of the vehicle while the vehicle is physically connected to the at least one dispenser, the notification generated based on the provided second command and including a visual depiction of the movement of the vehicle while the vehicle is physically connected to the at least one dispenser; and providing the notification for display on an end user device, wherein the end user device is a fueling station terminal operably coupled to the at least one dispenser via the forecourt controller, the fueling station terminal including an interactive display of the forecourt controller.

2. The method of claim 1, wherein the determining of the movement data includes:

performing automatic monitoring on the video feed;

identifying a feature in the video feed based on the automatic monitoring, the feature including at least one of a position and a motion of the at least one dispenser;

comparing the feature present in the video feed to at least one model feature, the model feature associated with the vehicle being physically connected to the at least one dispenser while the vehicle is in motion; and determining a similarity measure for the feature, the similarity measure indicative of a degree to which the feature matches the at least one model feature, wherein the movement data is determined when the determined similarity measure exceeds a predetermined threshold.

3. The method of claim 2, wherein the feature includes at least one of a position and a motion of the vehicle.

4. The method of claim 2, wherein the field of view includes a user of the at least one dispenser, and wherein the feature includes at least one of a position and a motion of the user.

5. The method of claim 1, wherein the notification is further provided to a mobile device of a fueling station attendant, the mobile device in operable communication with the forecourt controller, wherein the mobile device includes an interactive display, wherein the notification includes the visual depiction of the movement of the vehicle while the vehicle is physically connected to the at least one dispenser to be displayed on the interactive display of the mobile device.

6. The method of claim 1, wherein the alarm system includes at least one strobe lamp oriented toward the forecourt, and wherein the first command causes the strobe lamp to illuminate to thereby indicate movement of the vehicle while physically connected to the at least one dispenser.

7. The method of claim 1, wherein the notification is further transmitted to the vehicle, the vehicle having a graphical display, wherein the notification includes the visual depiction of the movement of the vehicle while the vehicle is physically connected to the at least one dispenser to be displayed on the graphical display of the vehicle.

8. The method of claim 1, wherein the receiving, the determining, and the generating is performed by at least one data processor forming part of at least one computing system.

9. A system comprising:

at least one data processor; and memory storing instructions configured to cause the at least one data processor to perform operations comprising:

receiving image data characterizing a video feed acquired by a camera oriented toward and including a field of view of a forecourt of a dispensing station including at least one dispenser operably coupled to a forecourt controller configured to manage operation of the dispensing station, the field of view including the at least one dispenser and a vehicle;

determining, from the received image data, movement data indicating that the vehicle is physically connected to the at least one dispenser while the vehicle is in motion;

determining one or more commands based on the determined movement data;

providing a first command to an alarm system having at least one speaker oriented toward the forecourt, the first command causing the at least one speaker to emit an audio message indicative of movement of the vehicle while physically connected to the at least one dispenser;

providing a second command to the forecourt controller, the second command identifying the at least one dispenser to be deactivated;

disabling, by the forecourt controller and responsive to receiving the second command, a flow of fuel to the at least one dispenser identified in the second command;

generating a notification indicative of movement of the vehicle while the vehicle is physically connected to the at least one dispenser, the notification generated based on the provided second command and including a visual depiction of the movement of the vehicle while the vehicle is physically connected to the at least one dispenser; and providing the notification for display on an end user device, wherein the end user device is a fueling station terminal operably coupled to the at least one dispenser via the forecourt controller, the fueling station terminal including an interactive display of the forecourt controller.

10. The system of claim 9, wherein the determining of the movement data includes:

performing automatic monitoring on the video feed; and identifying a feature in the video feed based on the automatic monitoring, the feature including at least one of a position and a motion of the at least one dispenser;

comparing the feature present in the video feed to at least one model feature, the model feature associated with the vehicle being physically connected to the at least one dispenser while the vehicle is in motion; and determining a similarity measure for the feature, the similarity measure indicative of a degree to which the feature matches the at least one model feature, wherein the movement data is determined when the determined similarity measure exceeds a predetermined threshold.

11. The system of claim 10, wherein the feature includes at least one of a position and a motion of the vehicle.

12. The system of claim 10, wherein the field of view includes a user of the at least one dispenser, and wherein the feature includes at least one of a position and a motion of the user.

13. The system of claim 9, wherein the alarm system includes at least one strobe lamp oriented toward the forecourt, and wherein the command causes the strobe lamp to illuminate to thereby indicate movement of the vehicle while physically connected to the at least one dispenser.

14. The system of claim 9, wherein the notification is further provided to a mobile device of a fueling station attendant, the mobile device in operable communication with the forecourt controller, wherein the mobile device includes an interactive display, wherein the notification includes the visual depiction of the movement of the vehicle while the vehicle is physically connected to the at least one dispenser to be displayed on the interactive display of the mobile device.

15. The system of claim 9, wherein the notification is further transmitted to the vehicle, the vehicle having a graphical display, wherein the notification includes the visual depiction of the movement of the vehicle while the vehicle is physically connected to the at least one dispenser to be displayed on the graphical display of the vehicle.

16. A non-transitory computer program product storing instructions which, when executed by at least one data processor forming part of at least one computing system, cause the at least one data processor to implement operations comprising:

receiving data characterizing a video feed acquired by a camera oriented toward and including a field of view of a forecourt of a dispensing station including at least one dispenser operably coupled to a forecourt controller configured to manage operation of the dispensing station, the field of view including the at least one dispenser and a vehicle;

determining, from the received data, movement data indicating that the vehicle is physically connected to the at least one dispenser while the vehicle is in motion;

determining one or more commands based on the determined movement data;

providing a first command to an alarm system having at least one speaker oriented toward the forecourt, the first command causing the at least one speaker to emit an audio message indicative of movement of the vehicle while physically connected to the at least one dispenser;

providing a second command to the forecourt controller, the second command identifying the at least one dispenser to be deactivated;

disabling, by the forecourt controller and responsive to receiving the second command, a flow of fuel to the at least one dispenser identified in the second command;

generating a notification indicative of movement of the vehicle while the vehicle is physically connected to the at least one dispenser, the notification generated based on the provided second command and including a visual depiction of movement of the vehicle while the vehicle is physically connected to the at least one dispenser; and providing the notification for display on an end user device, wherein the end user device is a fueling station terminal operably coupled to the at least one dispenser via the forecourt controller, the fueling station terminal including an interactive display of the forecourt controller.

\* \* \* \* \*